(12) United States Patent
Lotspiech

(10) Patent No.: US 7,721,098 B2
(45) Date of Patent: *May 18, 2010

(54) SYSTEM AND METHOD FOR GUARANTEEING SOFTWARE INTEGRITY VIA COMBINED HARDWARE AND SOFTWARE AUTHENTICATION

(75) Inventor: Jeffrey B. Lotspiech, Henderson, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/134,134

(22) Filed: Jun. 5, 2008

(65) Prior Publication Data

US 2008/0313460 A1 Dec. 18, 2008

Related U.S. Application Data

(63) Continuation of application No. 11/764,748, filed on Jun. 18, 2007, which is a continuation of application No. 10/259,542, filed on Sep. 26, 2002, now Pat. No. 7,240,200.

(51) Int. Cl.
*H04L 9/32* (2006.01)
(52) U.S. Cl. .................................. 713/170; 713/181
(58) Field of Classification Search .............. 713/181, 713/180, 170, 176, 168
See application file for complete search history.

(56) References Cited

U.S. PATENT DOCUMENTS

| | | | |
|---|---|---|---|
| 4,405,829 A | 9/1983 | Rivest et al. |
| 4,658,093 A | 4/1987 | Hellman |
| 5,343,527 A | 8/1994 | Moore |
| 5,978,482 A | 11/1999 | Dwork et al. |

(Continued)

FOREIGN PATENT DOCUMENTS

JP 7121107 5/1995

(Continued)

OTHER PUBLICATIONS

Rivest et al., "A Method for Obtaining Digital Signatures and Public-Key Cryptosystems", Feb. 1978, pp. 120-126.

(Continued)

*Primary Examiner*—Gilberto Barron, Jr.
*Assistant Examiner*—Virginia Ho
(74) *Attorney, Agent, or Firm*—Shimokaji & Associates, P.C.

(57) ABSTRACT

A system, method, and computer program product enabling individual user devices to authenticate and validate a digital message sent by a distribution center, without requiring transmissions to the distribution center. The center transmits the message with an appended modulus that is the product of two specially selected primes. The transmission also includes an appended authentication value that is based on an original message hash value, a new message hash value, and the modulus. The new message hash value is designed to be the center's public RSA key; a corresponding private RSA key is also computed. Individual user devices combine a digital signet, a public modulus, preferably unique hardware-based numbers, and an original message hash to compute a unique integrity value K. Subsequent messages are similarly processed to determine new integrity values K', which equal K if and only if new messages originated from the center and have not been corrupted.

42 Claims, 2 Drawing Sheets

U.S. PATENT DOCUMENTS

| | | |
|---|---|---|
| 6,038,316 A | 3/2000 | Dwork et al. |
| 6,105,137 A | 8/2000 | Graunke et al. |
| 6,138,236 A | 10/2000 | Mirov et al. |
| 6,256,668 B1 | 7/2001 | Slivka et al. |
| 6,266,771 B1 | 7/2001 | Bellare et al. |
| 6,272,536 B1 | 8/2001 | Van Hoff et al. |
| 6,334,189 B1 | 12/2001 | Granger et al. |
| 6,341,373 B1 | 1/2002 | Shaw |
| 6,629,244 B2 | 9/2003 | Davis |
| 7,197,637 B2 | 3/2007 | Schmidt |
| 7,412,480 B2 | 8/2008 | Baentsch et al. |
| 2002/0083318 A1 | 6/2002 | Larose |

FOREIGN PATENT DOCUMENTS

| | | |
|---|---|---|
| JP | 9233068 | 9/1997 |
| JP | 2002-156903 | 5/2002 |

OTHER PUBLICATIONS

P. Devanbu et al., "Security for Automated, Distributed Configuration Management" in proceedings, ICSE '99 Workshop on Software Engineering over the internet, 1999.

Information Materials for IDS dated Oct. 8, 2009 re Japanese Office Action dated Sep. 8, 2009.

SYSTEM AND METHOD FOR GUARANTEEING SOFTWARE INTEGRITY VIA COMBINED HARDWARE AND SOFTWARE AUTHENTICATION

REFERENCE TO PRIOR APPLICATIONS

This application is a continuation of prior application U.S. Ser. No. 11/764,748, filed on Jun. 18, 2007, which is a continuation of prior application U.S. Ser. No. 10/259,542, filed on Sep. 26, 2002, now U.S. Pat. No. 7,240,200.

FIELD OF THE INVENTION

This invention relates to software tamper resistance, and more specifically to authenticating and validating digital messages including software updates in the field. The invention may employ broadcast encryption distribution schemes wherein new keys unique to each hardware instance are not distributed, nor are any such keys or other user identification data described in any transmissions to a distribution center. The invention is of particular utility for content protection and digital rights management purposes.

BACKGROUND OF THE INVENTION

As digital storage technology and computer networks have advanced, efforts to ensure that digital content is made available for use only by authorized recipients have also progressed. One approach for providing security for digital content information is to distribute the information in encrypted form, and then to distribute necessary decryption information in the form of keys to only legitimate users. Unfortunately, unscrupulous legitimate users can share distributed decryption keys with unauthorized recipients, so there has been an increasing trend toward preventing anonymous sharing by requiring the recipient hardware to identify itself to the distributor of secured digital information as belonging to a particular user. The distributor may be the original vendor of secured digital information, or another party that handles the various security tasks (such as computing and communication) for the vendor.

For example, U.S. Pat. No. 4,658,093 to Hellman discloses a system in which a manufacturer of "base units" (specific hardware instances of user devices that perform computations) assigns a random key to be stored by each particular base unit. When a user wants to use a software package, the user's base unit generates a random number and communicates it to the software manufacturer. The manufacturer generates an authenticator response that is a cryptographic function of the particular base unit's key, the requested software, the number of authorized times the software may be used, and the random number generated by the base unit. The manufacturer then electronically delivers the authenticator response to the user's base unit, which uses the same cryptographic function to generate a check value. (The RSA cryptographic function is used by Hellman; it is described in U.S. Pat. No. 4,405,829 to Rivest et al., which is hereby incorporated by reference.) If the check value and the authenticator response match, the base unit accepts the authenticator response as valid and accordingly increments the number of times that delivered software may be used. The base unit verifies the message from the manufacturer using a digital signature and a hash of the manufacturer's message.

Digital signatures are known in the art and generate a single-bit yes/no answer to the question "Is this message authentic?". A hash is generally the output of a mathematical function that maps values from a large domain into a smaller range, is one-way in that it is computationally infeasible to find any input which maps to any pre-specified output, and is collision-free in that it is computationally infeasible to find any two distinct inputs which map to the same output. Such hashing functions are well known in the art. Unfortunately, the bidirectional communication that the Hellman system requires is not always available due to the distribution method employed or practical due to the sheer number of base units in the field. Also, the Hellman system requires an authorization and billing unit to maintain a memory of serial numbers and secret keys used to determine a base unit's secret key from knowledge of the base unit's public serial number.

U.S. Pat. No. 6,105,137 to Graunke et al. describes a similar system for authenticating and verifying the integrity of software modules. U.S. Pat. No. 6,138,236 to Mirov et al. extends this general approach to authenticating firmware programmed in a boot PROM and then using that trusted program code to authenticate a subsequent set of program code. The Mirov et al. system appends a digital signature to a self-extracting executable distribution file, and the distributed software is decrypted using a published public RSA decryption key. A comparison of decrypted hash values deems the self-extracting executable distribution file secure and free from accidental or intentional corruption if successful, or rejects and deletes the file if the comparison fails.

U.S. Pat. No. 6,341,373 to Shaw describes another secure data upgrading method that enables only selected portions of program code to be replaced. Shaw also requires the client device to transmit identification information regarding itself to a remote server before receiving updates from the server.

Commonly-owned U.S. Pat. No. 5,343,527 to Moore, U.S. Pat. No. 5,978,482 to Dwork et al., U.S. Pat. No. 6,038,316 to Dwork et al., and U.S. Ser. No. 09/894,035 by Baentsch et al. are hereby incorporated by reference. Moore teaches a method for providing a reuser of a software component from a reuse library with an indication of whether the software component is authentic and valid, or whether it has been tampered with by some unauthorized entity. Baentsch et al. teach a method of going from a first piece of program code to a second piece of program code (e.g. a software update) by combining the first piece of program code with a difference program code. The various program codes are signed by software providers' private keys and verified as authentic by use of a corresponding public key.

Tamper resistant software is becoming increasingly important because movies, music, text, applications, and databases are now being distributed in digital form with copy protection features. Software pirates might attempt to defeat these copy protection features simply by patching the software used in the player hardware; that is, by presenting a bogus software update to the player such that the player then makes all content accessible whether properly authorized to do so or not. Most companies in the industry rely on digital signatures to check the authenticity of a piece of software. This is not a foolproof approach, however, as the check can be disabled by patching a single instruction in player software.

Digital signets present a better solution to this problem than digital signatures. Digital signets are as difficult to forge as digital signatures, but instead of giving a single yes/no output like a digital signature, they produce an arbitrary sequence of bits K that is correct if and only if the hash of the received message is properly related to the signet.

The Dwork et al. patents cited above (one is a divisional of the other) describe digital signet based systems for protecting digital information where the logic behind extricating decryption keys for accessing the protected information is openly known and operates on an authorization number generated in response to a user number. The user number uniquely identifies and is valuable to the user, so that the user would be unwilling to disclose it to public view. User numbers could include credit card numbers, phone numbers, central processing unit ID numbers, or other numbers having personal sensitivity to the user. Thus, the user is reluctant to share keys or decrypted content with others for fear that the user number would be divulged and that the misbehaving user would be easily identified.

The hash value of a software program has proven to be a particularly good "user number". Modifications to a software program, such as those made by hackers trying to defeat a content protection scheme, cause its computed hash value to change. Therefore, content protection can be improved when the decryption keys used in a content protection scheme are successfully extricated and used only if the software program is provably intact and unmodified.

This is the typical prior art signet calculation: $K=g_1{}^h g_2{}^a$ mod M where K is an output sequence of bits, $g_1$ and $g_2$ are public numbers stored with the transmitted digital message itself, h is the hash of the message, and a is the digital signet. M is the public modulus under which this calculation is performed; in other words, K is the remainder after dividing the product $g_1{}^h g_2{}^a$ by M. M is usually a prime number, but does not have to be. The output K is the basis for comparison used to guarantee the authenticity and integrity of the message, which may comprise a software update.

While the prior art in this field describes worthy accomplishments, there exists a need for further improvements to address unsolved needs. For example, how can the value of K, which determines if access to protected information should be allowed, be shielded from attack by those who seek to pirate it and the information it protects? If no verifying transmissions from individual recipients are feasible, how can the software being executed by the recipients be legitimately updated in the field? Any modification to the software running on a user device will generally cause its hash to change, and the subsequently computed K value will no longer be correct. Replacing user hardware is generally infeasible, and transmission of new device keys to potentially millions of users also presents readily apparent problems.

SUMMARY OF THE INVENTION

It is accordingly an object of this invention to enable individual user devices to guarantee the authenticity and integrity of digital messages sent by a distribution center without transmissions from individual user devices to the distribution center. The invention is of particular utility for content protection and digital rights management purposes, as in the broadcast distribution of encrypted messages intended to be used only by a set of authorized recipients.

It is a related object of the invention that individual user devices store at least one pair of preferably unique numbers $g_1$ and $g_2$. User devices combine a digital signet a created by the distribution center and a public modulus M with $g_1$ and $g_2$ and an original message hash ho to compute an integrity value $K=g_1{}^{ho} g_2{}^a$ mod M, which is preferably unique to each individual user device. Individual user devices receive subsequent messages and similarly process each of them using the original digital signet a, a new message hash value h, a new authentication value s, and the original public modulus M to determine a new integrity value K'. The distribution center computes s to satisfy the formula $h_0 = s^h$ mod pq where $h_0$ is the original message hash value, and pq is a modulus transmitted with the message, where p and q are specially selected prime numbers.

It is a related object of the invention that the correct hash value $h_1$ of the new message is specifically designed to be the distribution center's public RSA key. The integrity value K' for the new message is computed as $g_1{}^x g_2{}^a$ mod M, where x is an intermediate value equal to $s^h$ mod pq. K' equals the original integrity value K if and only if the new message has not been corrupted and did in fact originate from the distribution center.

The foregoing objects are believed to be satisfied by the embodiments of the present invention as described below.

DETAILED DESCRIPTION OF THE INVENTION

Figure 1:
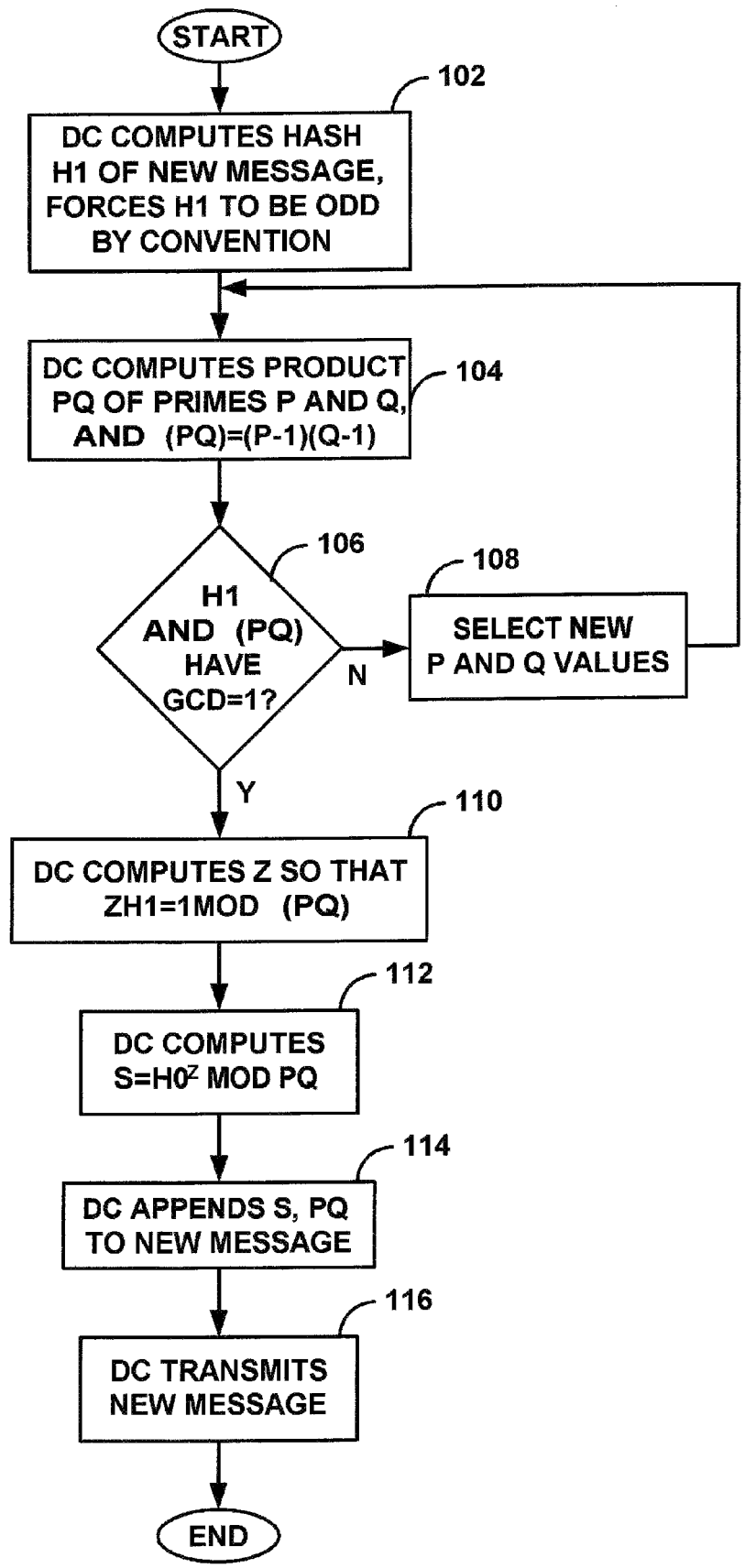
FIG. 1 is a diagram of the new message generation method according to a preferred embodiment of the present invention.

The invention enables individual user devices that perform computations to guarantee the authenticity and integrity of digital messages sent by a distribution center using a combination of hardware and software. The invention requires no transmission of data from individual user devices to the distribution center, particularly transmissions including any unique device-identifying information or cryptographic keys. The invention is of particular utility for content protection and digital rights management purposes, as in the delivery of content protection software that only allows correct extrication of an integrity value K' if the software is delivered intact.

The software relies on preferably unique and static hardware-based values to determine whether recipients are authorized to access protected content, but executes only if cryptographically authenticated and validated. The messages may include software upgrades portions of software programs that become complete when combined with cryptographically determined integrity values. Alternately, the integrity values K' themselves may comprise portions of software programs or cryptographic keys.

Individual user devices store in tamper-resistant hardware at least two preferably unique numbers $g_1$ and $g_2$. The tamper-resistant hardware can be included in, for example, multimedia cards as are widely used in personal computers. Multimedia cards are manufactured by Creative Labs (R), among others (for example, see www.creative.com for a description of the SoundBlaster (R) series of cards), and are well known in the art. Alternately, the individual user devices can comprise a completely secure computing system. It is desirable to have a hybrid hardware/software approach to the problem, so that unique combinations of values of $g_1$ and $g_2$ are stored in individual user devices like PC audio cards, but where the same software, such as a common audio card driver program, can be executed by many different cards. The values of $g_1$ and $g_2$ effectively serve as device keys that preferably uniquely identify a given user device hardware instance.

The distribution center creates a digital signet a and a public modulus M that are then combined with the device keys $g_1$ and $g_2$ and an original message hash $h_0$ by the user device to compute an integrity value K. Any hashing algorithm may be employed by the invention, including those that perform various obfuscation functions. Integrity value K is preferably unique to each individual user device, due to the uniqueness of a, $g_1$ and $g_2$, and is computed by the user devices as $K=g_1^{h_0}g_2^{a}$ mod M.

Individual user devices receive and process a subsequent message as follows: the user device calculates a message hash value h and identifies the values s and pq (to be described below) that are sent with the message. The user device calculates a new integrity value K' using the new values h, s, and pq and the existing values $g_1$, $g_2$, a, and M as follows:

$K'=g_1^{x}g_2^{a}$ mod M, where $x=s^h$ mod pq. Prime numbers p and q are selected as described below. Neither p nor q are transmitted separately. If the message hash value h is correct, then $x=h_0$, and the calculated integrity value K' equals the predetermined integrity value K. s therefore effectively an encryption of the original message value $h_0$, with the encryption based on new message hash value h and pq. Since the user device needs K for further correct operation (for example, K might contain device keys), the message will be properly processed if and only if its source and content are correct.

The correct hash value $h_1$ of the new message is designed to be the distribution center's public RSA key, which can be ensured if there is a z such that $h_1 z=1$ mod $\Phi(pq)$, where $\Phi$ is Euler's function, and in this case $\Phi(pq)=(p-1)(q-1)$. z then becomes the distribution center's private RSA key for the new message. For this formula to be satisfied, the greatest common denominator (gcd) of $h_1$ and $\Phi(pq)$ must be 1, i.e. they must have no common factors. Both (p−1) and (q−1) are even, so if $h_1$ is even, the relationship can never be satisfied and no z exists. Therefore, steps must be taken to ensure that $h_1$ is odd. All methods for ensuring that $h_1$ is odd are within the scope of the invention. For example, inconsequential changes to the new message can be made until the hash value of the new message becomes odd, or a convention can be adopted such that one is always either added to or subtracted from the hash value if it is even. Alternately, the low order bit of the hash can be OR'd. In yet another alternative, one could assign $h_1=2h_1+1$ to sure that $h_1$ is forced to be odd. If $h_1$ is odd, it is likely that the greatest common denominator is 1, but testing is required to guarantee this condition. If the greatest common denominator is not 1, the distribution center simply picks another set of primes p and q and tries another value of modulus pq. It is a common practice in RSA encryption to pick primes as follows: pick a random prime p', and test if 2p'+1 is also prime; if so, set p=2p'+1. Then, in this invention, do the same for q. If this practice is followed, the chance that an odd $h_1$ yields a greatest common denominator greater than 1 is vanishingly small.

Referring now to FIG. 1, a diagram of the new message generation method according to a preferred embodiment of the invention is shown. The distribution center (DC) prepares a new message for distribution to at least one user device (UD). All means of distribution are within the scope of the invention, including but not limited to downloading over a computer network such as the Internet, satellite and cable television transmission, and physical distribution of computer-readable media such as diskettes, CD-ROMs, and DVD-ROMs. In step 102, the distribution center computes a hash $h_1$ of the new message, and forces the hash to be an odd number by performing any one of the conventional steps described above. Next, the distribution center selects two prime numbers p and q in step 104 and computes $\Phi(pq)$ and the product pq. In step 106, the distribution center determines if hash $h_1$ and $\Phi(pq)$ have a greatest common denominator of 1, i.e. share no common factors. This condition determines if the relationship $h_1 z=1$ mod $\Phi(pq)$ is obeyed, so that the hash value $h_1$ of the new message is the distribution center's public RSA key. If the condition is not met, the distribution center selects new values for p and q in step 108 and then returns to step 104 to compute $\Phi(pq)$ and the modulus pq. If the condition is met, then the distribution center proceeds to calculate z in step 110 such that $zh_1=1$ mod $\Phi(pq)$. This is done with the well known mathematical procedure called the Generalized Euclid Algorithm. The distribution center proceeds in step 112 to compute $s=h_0^z$ mod pq, where $h_0$ is the original message hash value and z serves as a private RSA key. Only the distribution center can calculate z, because only the distribution center knows $\Phi(pq)$. The combination of the original hash value $h_0$ with the private key z serves as the basis for validation (verification of integrity) of the new message, as only the distribution center can create data used to determine a new integrity value K' that matches an original integrity value K. Next, in step 114, the distribution center appends the values of s and pq to the new message. Finally, in step 116 the distribution center transmits the new message.

Figure 2:
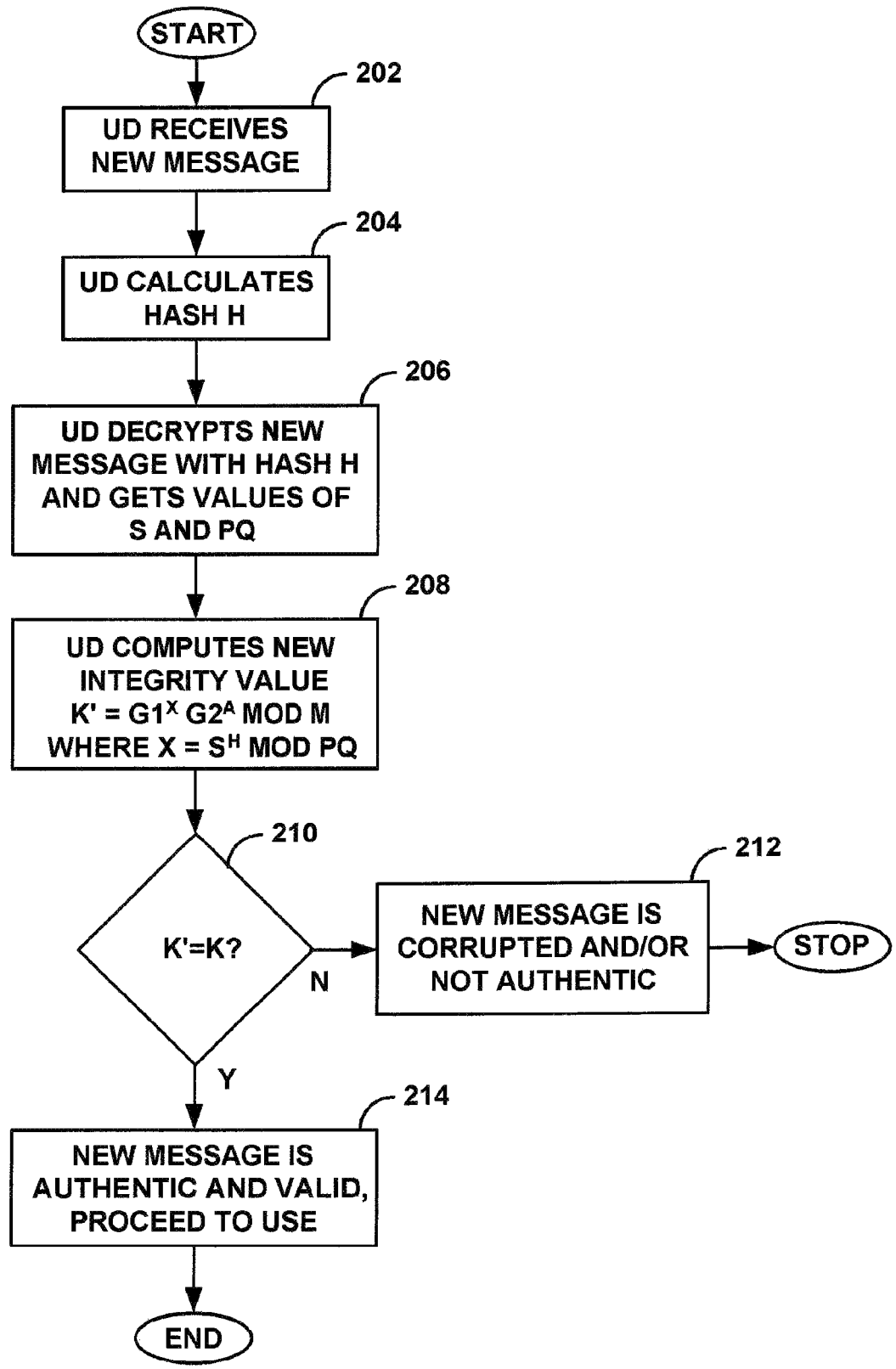
FIG. 2 is a diagram of the new message authentication and validation method according to a preferred embodiment of the present invention.

Referring now to FIG. 2, a diagram of the new message authentication and validation method according to a preferred embodiment of the present invention is shown. Each user device (UD) is a specific hardware instance capable of performing computational method steps involved in guaranteeing the integrity of new messages from a distribution center. Each user device stores in tamper-resistant or completely secure hardware preferably unique values $g_1$ and $g_2$ and a. In step 202, the user device receives the new message from the distribution center. Next, in step 204 the user device calculates a test hash value h of the new message using the same hashing algorithm employed by the distribution center. In step 206, the user device proceeds to compute a new integrity value K' with the received values of s and pq, its own device values $g_1$ and $g_2$, the hash value of the new message h, the digital signet a and modulus M as described above. In step 208, the new integrity value K' is used in further processing as if it were K. Of course, if K' is not equal to K, the further processing will fail. Thus, an attacker trying to gain some advantage by modifying the message will cause total failure rather than the limited behavior modification desired.

A general purpose computer is programmed according to the inventive steps described above. The invention can also be embodied as an article of manufacture—a machine component—that is used by a digital processing apparatus to execute the present logic. This invention is realized in a critical machine component that causes a digital processing apparatus to perform the inventive method steps described above. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device. The method described also serves as the basis for conducting electronic commerce.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

I claim:

1. A system for guaranteeing message integrity, comprising:

a distribution center that transmits a transmission wherein said transmission includes a message and an appended first value; and a user device that receives said transmission and computes an integrity value K' that depends on said transmission and at least one of a plurality of stored values where K' selectively enables successful further processing of said message;

wherein said plurality of stored values include a predetermined integrity value $K=g_1^{h_0}g_2^a$ mod M, where a is a digital signet, M is a public modulus, and $g_1$ and $g_2$ are unique values and $h_0$ is an original first hash value.

2. The system of claim 1 wherein said appended first value includes a modulus pq and an authentication value s.

3. The system of claim 2 wherein said authentication value s is an encrypted version of $h_0$, said modulus pq, and a private RSA key z, where $s=h_0^z$ mod pq.

4. The system of claim 3 wherein p and q are prime numbers, and said modulus pq is a product of p and q, neither of said p and q being separately included in said transmission.

5. The system of claim 4 wherein said prime numbers p and q are selected by said distribution center such that a likelihood of a product $(p-1)(q-1)$ and an odd-valued correct second hash value $h_1$ of said message having a greatest common denominator other than 1 is substantially zero, whereby $h_1z=1$ mod $\Phi(pq)$, where $\Phi(pq)=(p-1)(q-1)$, and $h_1$ is a public RSA key corresponding to said private RSA key z.

6. The system of claim 5 wherein said integrity value K' equals $g_1^x g_2^a$ mod M, where $x=s^h$ mod pq, and h is a third hash value of said message computed by said user device.

7. The system of claim 6 wherein said integrity value K' is a value required to enable successful further processing of said message if and only if h matches $h_1$, guaranteeing the integrity of said message.

8. The system of claim 5 wherein $h_1$ is forced to be odd, if initially even.

9. The system of claim 1 wherein said message comprises a software program.

10. The system of claim 1 wherein said message comprises a software program portion.

11. The system of claim 1 wherein said message comprises a software program that controls access to protected information.

12. The system of claim 1 wherein said message includes a first software program portion, and said integrity value K' includes a second software program portion, and said message and said integrity value K' together comprise a complete software program.

13. The system of claim 1 wherein said message comprises protected information intended for use only by authorized recipients.

14. The system of claim 13 wherein said protected information comprises at least one of: a text file, an audio file, a video file, an application, and a database.

15. The system of claim 1 wherein said stored values are stored in tamper-resistant hardware.

16. A system for guaranteeing message integrity, comprising:

a user device having at least one of a plurality of stored integrity values related to an additional integrity value $h_0$;

a distribution center that transmits a transmission wherein the transmission includes a message and an appended first value including an encryption of said additional integrity value $h_0$, where said encryption uses a key based on a hash of said message;

wherein the user device receives said transmission and computes an integrity value K' that depends on said transmission and at least one of a plurality of stored second values, where K' selectively enables successful further processing of said message; and wherein said plurality of stored second values include a predetermined integrity value $K=g_1^{h_0}g_2^a$ mod M, where a is a digital signet, M is a public modulus, and $g_1$ and $g_2$ are unique instances of the stored second values.

17. The system of claim 16 wherein said plurality of stored integrity values are digital signet values, and said additional integrity value $h_0$ is a digital signet user number.

18. The system of claim 17 wherein said digital signet values allow the calculation of third values used in a content protection scheme.

19. The system of claim 16 wherein said encryption of said additional integrity value $h_0$ is an RSA encryption, and the distribution center additionally transmits an RSA modulus pq.

20. The system of claim 16 wherein said message comprises a software program and associated data.

21. A computer program product for guaranteeing message integrity, comprising a computer-readable storage medium tangibly embodying computer readable program code thereon, said computer-readable program code comprising:

computer readable program code configured to transmit a transmission wherein said transmission includes a message and an appended first value from a distribution center;

computer readable program code configured to receive said transmission with a user device; and computer readable program code configured to compute an integrity value K' that depends on said transmission and at least one of a plurality of stored second values where K' selectively enables successful further processing of said message, wherein said plurality of stored second values include a predetermined integrity value $K=g_1^{h_0}g_2^a$ mod M, where a is a digital signet, M is a public modulus, and $g_1$ and $g_2$ are unique values, and $h_0$ is an original first hash value.

22. A method for guaranteeing message integrity, comprising:

transmitting a transmission from a distribution center wherein the transmission includes a message together with an appended first value including an encrypted integrity second value $h_0$, said encrypted integrity second value $h_0$ being encrypted with a key based on a hash of said message;

decrypting said encrypted integrity second value $h_0$;

using said encrypted integrity second value $h_0$ together with stored integrity third values to perform an integrity calculation;

using the result of said integrity calculation for further processing;

receiving said transmission by a user device and computing an integrity fourth value K' that depends on said transmission and at least one of a plurality of stored fifth values, where K' selectively enables successful further processing of said message;

wherein said plurality of stored values include a predetermined integrity sixth value $K=g_1^{h_0}g_2^a$ mod M, where a is a digital signet, M is a public modulus, and $g_1$ and $g_2$ are unique seventh values.

23. The method of claim 22 wherein said encryption of $h_0$ is an RSA encryption and an RSA modulus is also transmitted.

24. The method of claim 22 wherein said integrity calculation is a digital signet calculation.

25. The method of claim 24 wherein results of said digital signet calculation are eighth values used in a content protection scheme.

26. The method of claim 22 wherein said message comprises a software program and associated data.

27. A method for conducting electronic commerce, comprising:
   transmitting a transmission wherein the transmission includes a message and an appended first value from a distribution center;
   receiving said transmission with a user device; and
   computing with the user device an integrity value K' that depends on said transmission and at least one of a plurality of stored second values where K' selectively enables successful further processing of said message,
   wherein said further processing completes an electronic commerce transaction, and said plurality of stored second values include a predetermined integrity value $K = g_1^{h_0} g_2^a \mod M$, where a is a digital signet, M is a public modulus, $g_1$ and $g_2$ are unique third values and $h_0$ is an original first hash value.

28. A method for guaranteeing message integrity, comprising:
   transmitting a transmission wherein the transmission includes a message and an appended first value from a distribution center;
   receiving said transmission with a user device;
   computing an integrity value K' that depends on said transmission and at least one of a plurality of stored values, where K' selectively enables successful further processing of said message;
   wherein said plurality of stored values include a predetermined integrity value $K = g_1^{h_0} g_2^a \mod M$, where a is a digital signet, M is a public modulus and $g_1$ and $g_2$ are unique values, and $h_0$ is an original first hash value.

29. The method of claim 28 wherein said appended first value includes a modulus pq and an authentication second value s.

30. The method of claim 29 wherein said authentication second value s is an encrypted version of the original first hash value $h_0$, said modulus pq, and a private RSA key z, where $s = h_0^z \mod pq$.

31. The method of claim 30 wherein p and q are prime numbers and said modulus pq is a product of p and q, neither p and q being separately included in said transmission.

32. The method of claim 31 wherein p and q are selected by said distribution center such that a likelihood of a product $(p-1)(q-1)$ and an odd-valued correct second hash value $h_1$ of said message having a greatest common denominator other than 1 is substantially zero, whereby $h_1 z = 1 \mod \Phi(pq)$, where $\Phi(pq) = (p-1)(q-1)$, and $h_1$ is a public RSA key corresponding to said private RSA key z.

33. The method of claim 32 wherein said integrity value K' equals $g_1^x g_2^a \mod M$, where $x = s^h \mod pq$, h is a third hash value of said message computed by said user device, M is a public modulus, a is a stored digital signet, and $g_1$ and $g_2$ are unique stored third values.

34. The method of claim 33 wherein said integrity value K' is a fourth value required to enable successful further processing of said message if and only if h matches $h_1$, guaranteeing the integrity of said message.

35. The method of claim 32 wherein $h_1$ is forced to be odd, if initially even.

36. The method of claim 28 wherein said message comprises a software program.

37. The method of claim 28 wherein said message comprises a software program portion.

38. The method of claim 28 wherein said message comprises a software program that controls access to protected information.

39. The method of claim 28 wherein said message includes a first software program portion, and K' includes a second software program portion, and said message and K' together comprise a complete software program.

40. The method of claim 28 wherein said message comprises protected information intended for use only by authorized recipients.

41. The method of claim 40 wherein said protected information comprises at least one of: a text file, an audio file, a video file, an application, and a database.

42. The method of claim 28 wherein said plurality of stored values are stored in tamper-resistant hardware.

* * * * *